United States Patent [19]
Davis

[11] 3,852,626
[45] Dec. 3, 1974

[54] LINEAR INDUCTION MOTOR

[76] Inventor: Murray W. Davis, 20501 Woodmont, Harper Woods, Mich. 48225

[22] Filed: Mar. 9, 1973

[21] Appl. No.: 339,738

Related U.S. Application Data

[63] Continuation-in-part of Ser. No. 176,087, Aug. 30, 1971, abandoned.

[52] U.S. Cl. ................................................. 310/13
[51] Int. Cl. ............................................ H02k 41/02
[58] Field of Search ............................... 310/12–14; 104/148 LM

[56] References Cited
UNITED STATES PATENTS

| | | | |
|---|---|---|---|
| 3,374,823 | 3/1968 | Ford | 310/13 X |
| 3,508,088 | 4/1970 | Davey | 310/13 |
| 3,746,899 | 7/1973 | Eastham | 104/148 LM X |

*Primary Examiner*—Donovan F. Duggan
*Attorney, Agent, or Firm*—Cullen, Settle, Sloman & Cantor

[57] ABSTRACT

A linear induction motor including primary cores or blocks having a set of primary field windings thereon, secondary cores and an elongated metal channel having an upper surface with the primary and secondary cores arranged on opposite sides thereof. The upper channel surface has a central slit extending the full length thereof to form a pair of coplanar strips which serve as secondary conductors. Electrically energized bands are arranged within and extend along the length of the channel and are slidably contacted by brushes or the like to energize the primary field windings. The cores and brushes are mounted on a support to form a unit which moves linearly along the length of the channel.

14 Claims, 11 Drawing Figures

PATENTED DEC 3 1974 3,852,626

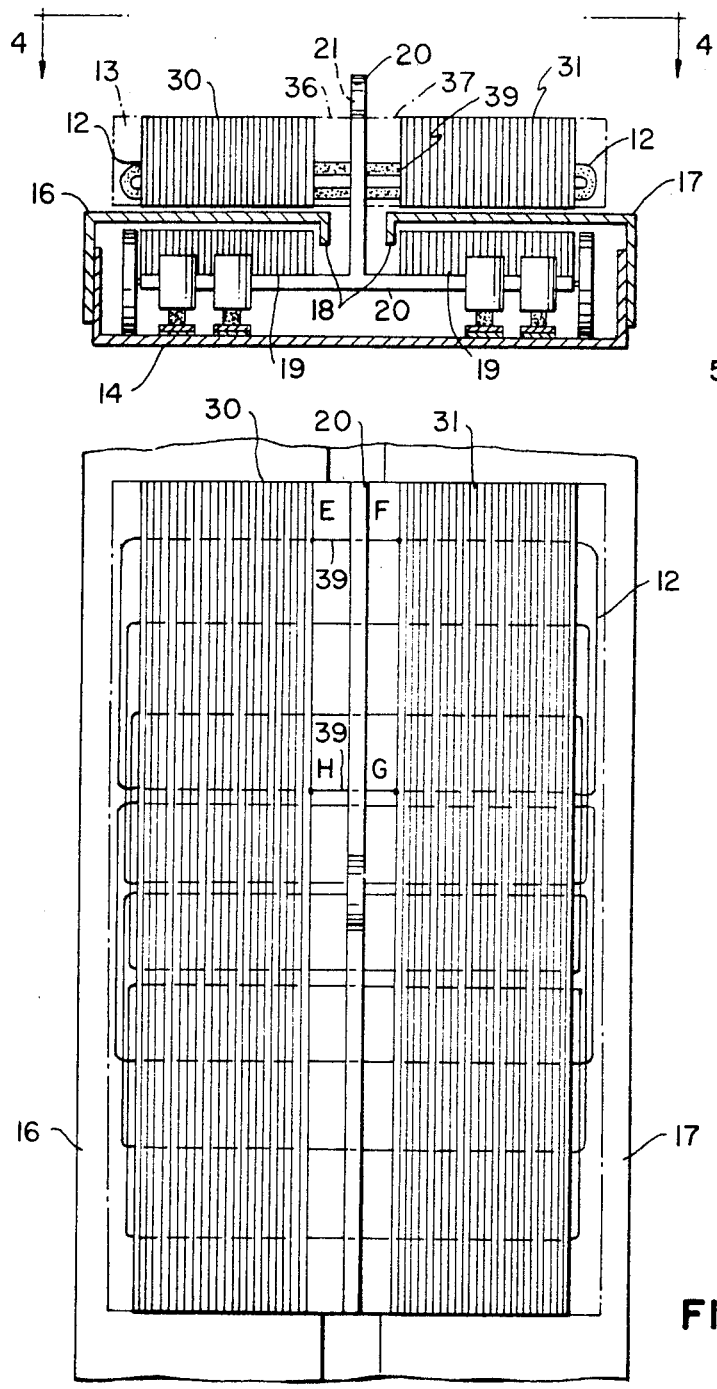
FIG. 3
FIG. 4
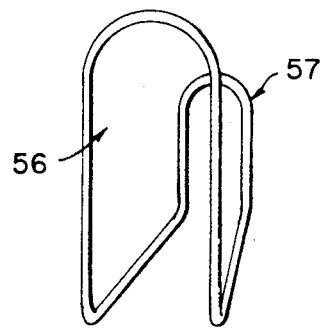
FIG. 9
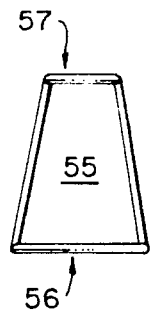
FIG. 10

LINEAR INDUCTION MOTOR

CROSS-REFERENCE TO RELATED APPLICATION

This is a continuation-in-part of my copending application Ser. No. 176,087, filed Aug. 30, 1971, now abandoned entitled Linear Induction Motor.

BACKGROUND OF THE INVENTION

This invention herein relates to a linear induction motor which is broadly similar to that disclosed in my U.S. Pat. No. 3,602,745, issued Aug. 31, 1971, and is an improvement over the linear induction motor which is disclosed in my copending application Ser. No. 176,087, filed Aug. 30, 1971.

Linear induction motors have various applications where it is desired that one element move along a track or channel. These applications include traverse drapery rods, garage door openers, fast transportation vehicles, and baggage handling, where the motion is horizontal, and hoists, elevators and cranes where the motion may be vertical or horizontal.

In linear induction motors, there are several basic problems. First, linear induction motors in the prior art typically have the arrangement of a primary core and a secondary core such that all the magnetic flux produced by the primary core do not link the secondary core. That is, all of the flux paths are not workable or usable. A device of this type is illustrated in the U.S. Pat. to Ford, No. 3,374,823.

A second problem, in the construction of linear induction motors involving multiple cores, as in the U.S. Pat. to Jones, No. 2,412,511, is the end turns between the cores which result in increased power loss and increased cost of the copper or other material necessary to form these windings.

Therefore, it is an object of the present invention to provide an improved linear induction motor wherein all the iron in the primary and secondary core provides or receives useful or working flux.

It is another object of the present invention to provide an improved efficiency linear induction motor by reducing power losses due to excess windings between cores.

SUMMARY OF THE INVENTION

The invention herein contemplates forming a linear induction motor comprising primary cores or stators with one set of primary field windings thereon and secondary cores with all the cores mounted to move as a single unit. The unit moves along a channel which serves as a secondary conductor or rotor. Electrically conductive bands are arranged within the channel and are engaged by contact brushes.

The channel may be of almost any length so that the unit may reciprocate or move considerable longitudinal distances along the channel.

By placing the electrically conductive bands within the channel, the bands are concealed thus reducing the possibility of short circuits, safety hazards and the like. The channel may be provided with suitable guides for guiding rollers which may be mounted upon the movable unit thus reducing friction and supporting the unit in such a way that it may freely move along the channel with relatively low power requirements.

Various embodiments of core arrangements and field winding arrangements are disclosed. The primary field winding arrangements eliminate end turns between the primary cores thereby reducing heat loss and the overall cost since less material is utilized to form these windings. The elimination of end turns between the primary cores also allows the primary cores to be placed closer together, thereby reducing the overall width of the primary core block. Furthermore, the use of less field winding material reduces the weight of the movable core.

The core arrangements provide that each primary core has a corresponding opposed secondary core of the same surface area so that all of the flux paths from the primary core magnetically link the secondary core. Thus, all the magnetic flux from the primary cores is usable. Furthermore, for a given weight secondary core, the primary core may be smaller and lighter than in the prior art, thus further reducing the weight of the movable core.

One core arrangement utilizes two cores having one set of primary field windings. The windings are formed without end turns between the cores and each winding is in the form of a closed-loop saddle having a front portion which is both higher and wider than the rear portion. Thus the saddle is tapered from front to rear.

The method of the present invention includes forming windings as closed-loop conductors in the form of a saddle. The cores are placed in an opposed, spaced apart relationship and the windings successively inserted into the cores with the tapers oriented in the same direction. Alternatively, after formation of the windings, the windings may be dove-tailed together with all the tapers oriented in the same direction and the opposed cores may then be inserted thereupon.

Further objects and advantages of this invention will become apparent upon reading the following description, of which the attached drawings form a part.

DESCRIPTION OF THE DRAWINGS

In the drawings, wherein like numerals identify corresponding parts:

FIG. 3 is an end view of a linear induction motor according to the present invention;

FIG. 4 is a top plan view of the linear induction motor of FIG. 3 as seen in the direction of arrows 4—4 of FIG. 3;

FIG. 6 is an end view of the linear induction motor of the present invention which may be conveniently installed below ground level such as for baggage handling and the like;

FIG. 9 is an illustration of a single closed-loop saddle winding shown in perspective;

FIG. 10 is a top plan view of the winding of FIG. 9; and

DETAILED DESCRIPTION OF THE INVENTION

Figure 1:
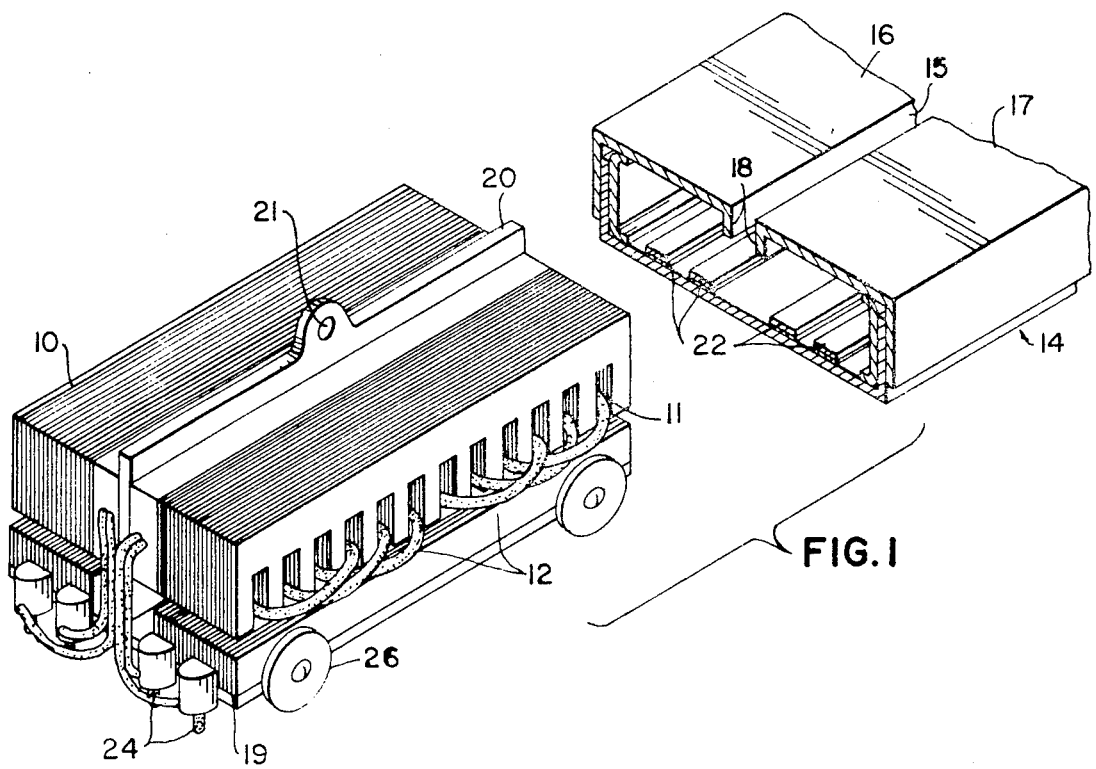
FIG. 1 is a perspective exploded view of the movable core unit separated from the elongated channel.
Figure 2:
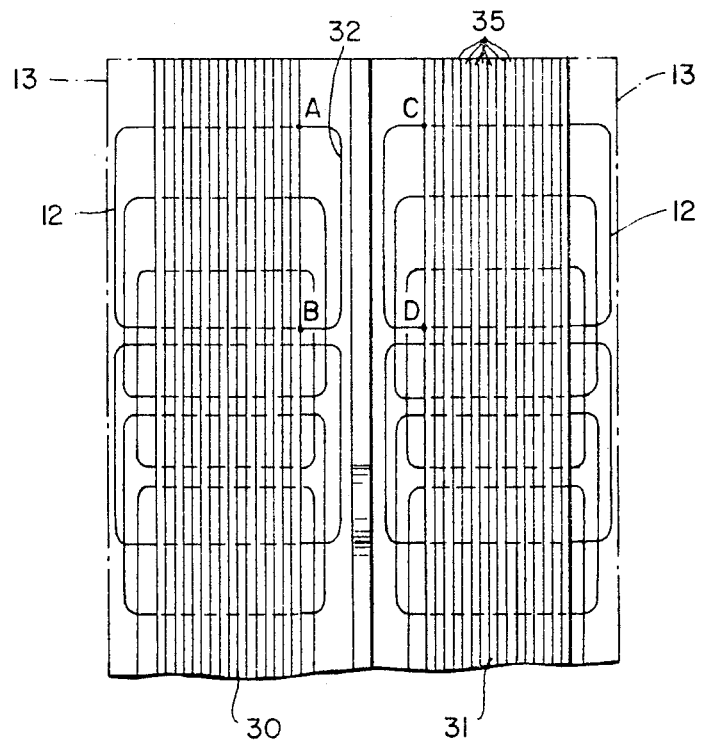
FIG. 2 is a partial top plan view of a prior art linear induction motor.

Referring first to FIGS. 1 and 2, a linear induction motor includes a primary core block 10 having a plurality of transverse slots 11 through which are inserted the primary or field windings 12. The block 10 is typically of a material such as iron which has a high magnetic permeability and is usually in the form of a plurality of laminations. The primary conductors or field windings 12 extend beyond the core and are typically encapsulated as at 13 in an electrically insulating material, as shown in FIG. 2.

The linear induction motor also includes an elongated channel or track 14 having an upper flat base with a central slit 15 extending the full length thereof to form a pair of coplanar strips 16 and 17 which serve as secondary conductors or secondary windings.

The coplanar strips 16, 17 may have downwardly projecting flanges 18 to provide a low resistance current return path. Secondary cores 19 are disposed on the opposite sides of the secondary conductors 16 and 17 from the primary cores 10. These secondary cores are also of a material such as iron.

Means are provided to interconnect and support the cores so they may move as a single unit. Specifically, support means 20 are provided and may take the shape of an inverted T. The top of the support means 20 includes an aperture 21 which may be connected to a work piece which is to be moved by the linear movement of the motor.

Within the elongated channel 14 there are typically provided a plurality of bus bars or bands 22, electrically insulated from the channel 14, to which a source of electricity is connected. Brushes 24 or the like, mounted on the support 20 or secondary cores 19, receive A-C excitation from the bus bars and energize the primary field windings 12 by means of leads to the primary windings. Wheels 26 are secured to the movable core unit to reduce friction as the unit moves along the channel 14.

FIG. 2 is a partial top plan view of a prior art primary field winding arrangement. The remainder of the motor would be similar to FIG. 1, and, therefore, has been eliminated from the drawing for clarity and ease of description. The motor of FIG. 2 includes a primary core block comprising a first primary core 30 and a second primary core 31, each having a field winding 12. It is noted that there are a plurality of end turns 32 between the two primary cores 30 and 31.

Each core comprises a plurality of laminations 35, and the primary field windings are illustrated as a three-pole, three-phase winding. The particular number of phases, however, may be varied in accordance with the requirements of use.

In operation, when electrical power is supplied to the bands 22, this power is picked up by the brushes 24 to energize the primary field windings 12. Thus, primary cores 30, 31 generate magnetic flux. Since the secondary cores 19 are aligned with the primary cores, and the surface area of each secondary core is the same as the surface area of its opposed aligned primary core, all the primary core flux links the secondary core. Thus all the flux from the primary core is usable by the secondary core. With the windings thus energized, the primary core — secondary core unit moves or translates linearly along the channel 14.

Referring to FIGS. 3 and 4, the inventive concept for reducing weight and cost of the field windings by eliminating end turns between cores is illustrated in a motor, which includes primary cores 30, 31, secondary cores 19, the elongated channel 14 having secondary conductors 16, 17, and primary field windings 12.

The support means 20 may be slotted, and aligned with the transverse slots 11 in the cores, so that the field winding 12 may pass therethrough.

The support means 20 includes two pieces, 36 and 37, which may be blocks of electrically insulating material, or any other suitable, lightweight, non-deformable material, and provides a means for rigidly supporting the two primary cores. These two blocks 36 and 37 also contain a plurality of transverse slots aligned with the slots 11 in the primary cores 30, 31 and the slots in the support means 20. The support means 20 permit the four cores to move as a single unit.

By comparing FIGS. 2 and 4, it is noted that the end turns 32 between the primary cores 30 and 31 of FIG. 2 are eliminated and replaced by directly extending each winding from core 30 to core 31 as at 39 in FIG. 4. Specifically, the entire length of the end turns in FIG. 2 from a point A where the winding of the first phase leaves the laminations of core 30 to a point B where the winding re-enters the laminations, plus the total length of winding from a point C on the opposed primary core 31 to the corresponding re-entry point D is replaced by two short segments 39, in FIG. 4 extending from E to F and from G to H.

Since these windings are typically of copper, it is immediately apparent that the elimination of end turns reduces the total amount of copper needed for the field windings. This reduction in copper reduces the expense of the windings and the weight of the movable cores, since less copper is used, and furthermore, increases the efficiency since there is less copper for heat losses.

The overall size of the core structure may also be reduced by eliminating these end turns since the primary cores 30, 31 may be placed closer together. Furthermore, since the weight is reduced, the cores will move at a greater speed along the track or channel 14 with the same power input.

Since the synchronous speed, $V_s$ of a linear induction motor is related to the pole pitch P and frequency F by the formula $V_s = 2PF$ as the pole pitch is increased the length of the end turns between adjacent cores is also increased. By eliminating these end turns according to the principles of this invention, greater speed may be attained while reducing the amount of copper utilized in the field windings.

EMBODIMENT OF FIG. 5

Figure 5:
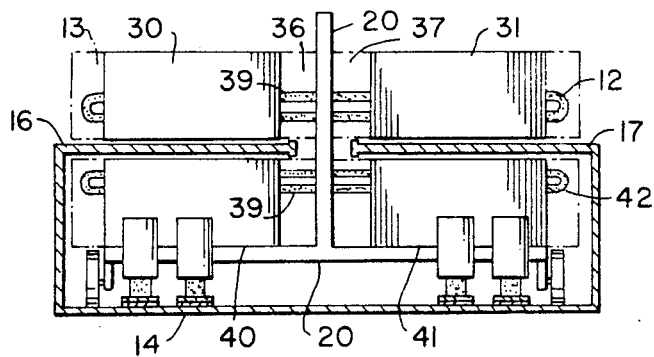
FIG. 5 is an end view of another embodiment of a linear induction motor of the present invention.

The motor of FIG. 5 includes primary cores 30, 31 having field windings 12 thereon and disposed above the secondary conductors 16, 17 and two opposed cores 40, 41 having field windings 42 thereon and disposed below the secondary conductors. Support means are again provided, as at 20, for interconnecting the four cores so they move as a unit. The windings 12 and 42 are each provided without end turns between the cores.

Thus, each primary core 30, 31 has an opposed, aligned core 40, 41, of the same surface area so that all flux is workable or usable. Since each core has a primary field winding 12 or 42, each core serves as both a primary core and a secondary core. Thus, cores 30, and 31 have a common winding as primary cores and cores 40, 41 serve as secondary cores with respect thereto. Furthermore, the field winding 42 on the cores 40, 41 permits these cores to serve as primary cores and cores 30, 31 serve as secondary cores with respect thereto.

The benefit of this multi-core unit is a motor producing twice the output force for a given core heat loss.

EMBODIMENT OF FIG. 6

Figure 6:
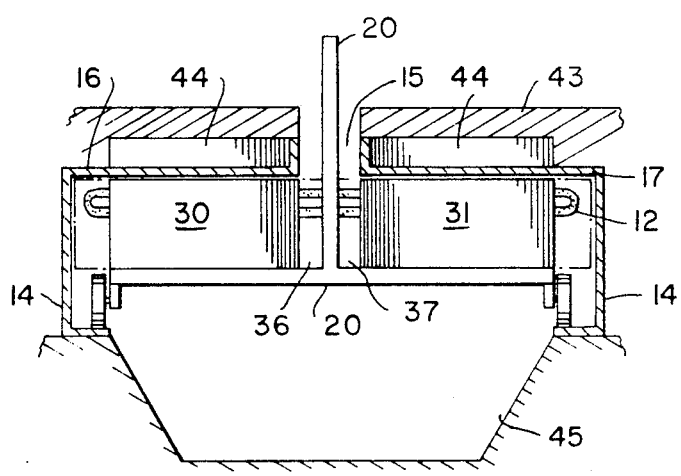

The motor of FIG. 6 provides an increased advantage in airport baggage handling and the like where the linear induction motor moves beneath the ground. The ground is illustrated as at 43 and only two primary cores are utilized. The cores 30, and 31 have a common field winding 12 without end turns therebetween. The secondary conductors 16, 17, are either iron or an electrically conductive material backed by iron. To illustrate this, secondary iron cores 44 are shown as being attached to the stationary conductors 16 and 17.

When this structure is placed below the ground and within an elongated channel 14 which serves as a secondary conductor, rain, snow and ice, and foreign matter such as dirt and the like will not hinder the operation. The slot 15 between the strips 16 and 17 of the channel is very small since only the support means 20 need extend therethrough. Any foreign material which should enter the slot will fall through the channel, since the channel does not have a bottom, and into a drain 45.

Since the cores 30, 31, are located beneath the secondary conductors 16, 17, no foreign material entering the slot can collect on that portion of the channel 14 between the cores 30, 31 and the secondary conductors 16 and 17. Thus, the channel 14 provides a clear unobstructed track for the linear motion of the motor. Wheels 26 or the like, as in FIG. 1, may be used to reduce friction and provide support during linear movement.

EMBODIMENT OF FIG. 7

Figure 7:
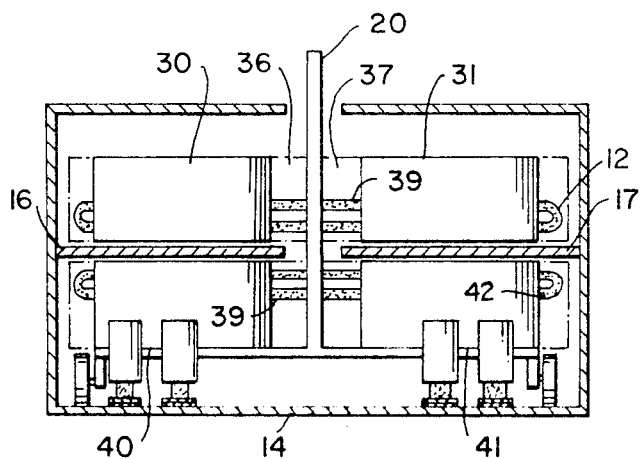
FIG. 7 is an end view of another linear induction motor according to the present invention.

FIG. 7 illustrates a motor having primary cores 30, 31 with field windings 12, and cores 40, 41 with their field windings 42. Again, there are no end turns between the adjacent core pairs 30, 31 and 40, 41. The channel 14 includes secondary conductors 16, 17. The channel 14 is formed as a single extrusion, thereby allowing the entire motor to be totally enclosed while providing twice the output power as the motor of FIG. 5.

EMBODIMENT OF FIGS. 8–11

Figure 8:
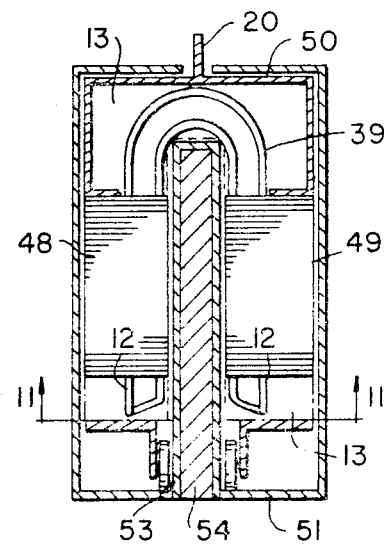
FIG. 8 is an end view of yet another linear induction motor according to the principles of the present invention.
Figure 11:
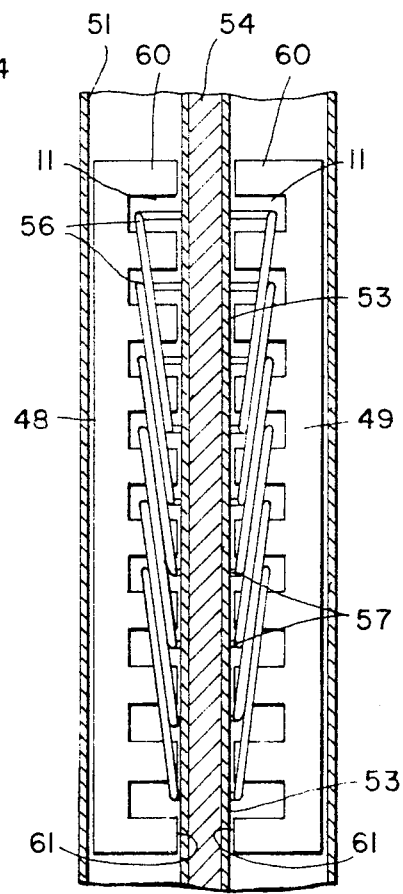
FIG. 11 is a bottom plan view taken in the direction of the arrows 11—11 of FIG. 8.

FIG. 8 illustrates a motor having two cores 48, 49 wired with one set of field windings 12 without end turns therebetween. The core windings are encapsulated as at 13 and mounted in a support bracket 50. A channel 51 surrounds the core unit and the core unit is slidably mounted therein such as by wheels as in the previous embodiments.

A secondary conductor 53 is provided between the cores 48, 49 and may be integrally formed with the channel 51 such as by extrusion. Within the conductor 53 is an elongated core 54 of a magnetically permeable material such as iron.

Each field winding 12 of FIG. 8 is formed as a closed loop, saddle-shaped conductor 55 having a front portion 56 which is both wider and higher than the rear portion 57. FIGS. 9 and 10 illustrate this saddle-shaped conductor and it is noted that there is a gradual taper from the wider front portion to the narrower rear portion.

When it is desired to assemble the cores and windings of the motor of FIGS. 8–11, the individual closed-loop conductors are first formed. Then, in one embodiment, the two cores are placed in an opposed relationship with core teeth 60 and slots 11 aligned and the teeth faces 61 spaced apart. Then, each winding 55 is successively inserted into the slots 11 with all the narrow, rear portions 57 oriented in the same direction. Since the windings are tapered, successive windings may be mated or dove-tailed together.

Alternatively, the windings may be dove-tailed or fit one on top of the other first, and then the cores 48, 49 are mated together with the teeth faces and core teeth inserted between adjacent windings. Such insertion would be with the core teeth moving between the front and rear portions of the windings so that the front and rear portions fit within transverse slots 11.

Thus, there has been disclosed various embodiments of the present invention. These embodiments should be taken only as explaining the underlying concepts of the present invention and not read in a restrictive sense. The invention may be further developed within the scope of the following claims.

What is claimed is:

1. In a linear induction motor including primary field windings, an elongated metal channel having an upper, flat base, the base having a central slit extending the full length thereof to form a pair of co-planar strips with the strips thus forming secondary conductors, and means for electrically energizing the primary field windings, the improvement comprising:

two flat, plate-like, primary cores of magnetically permeable material, each arranged above one of said coplanar strips and each of said primary cores having a plurality of transverse slots with the slots in each primary core opposing and aligned with a corresponding slot in the other primary core, and further having one set of primary field windings linking both primary cores without end turns therebetween by extending from a slot in one primary core directly to the opposed, aligned corresponding slot in said other primary core, two flat, plate-like secondary cores of magnetically permeable material, each arranged below one of said coplanar strips and aligned beneath one of said primary cores with each secondary core having substantially the same surface area as its aligned primary core, means extending through said slit and between said strips for rigidly spacing one of said primary cores from the other and for interconnecting both of said primary cores and both of said secondary cores to form a unit, whereby upon the energization of said primary field windings to cause the primary core-secondary core unit to move linearly along the length of said channel, the alignment of said cores establishes only usable magnetic flux paths from each primary core to its aligned secondary core.

2. The improvement of claim 1 wherein said rigidly spacing means has transverse slots therein aligned with said slots in said primary cores, said primary field windings are formed on said primary cores without end turns between the cores by extending each winding across one of said primary cores, directly through said aligned slot in said rigidly spacing means and across the other of said primary cores, > whereby end turns in the region between the two primary cores is eliminated, thereby reducing both the total amount of copper required for the primary field windings and the power loss associated therewith,
> and whereby the two primary cores may be located closer together since clearance for end turns therebetween is no longer needed.

3. The improvement of claim 1 and further including:

> a first set of primary field windings associated with said two primary cores,
> a second set of primary field windings associated with said two secondary cores, and
> wherein said rigidly spacing means further attaches one of said secondary cores to the other of said secondary cores, whereby each primary core also functions as a secondary core and each secondary core also functions as a primary core, and said coplanar strips function as a secondary conductor for all of said cores.

4. The improvement of claim 3 wherein:

> said second set of primary field windings are formed on said secondary cores without end turns therebetween by extending each winding across one of said secondary cores, through said rigidly spacing means, and across the other of said secondary cores.

5. In a linear induction motor including a field winding, an elongated metal channel having an upper, flat base, the base having a central slit extending the full length thereof and having at least one longitudinal strip thus forming a secondary conductor, and means for electrically energizing the field winding, the improvement comprising:

> first and second flat cores of magnetically permeable material, each of said flat cores having transverse slots aligned with and opposing the slots in said other flat core and corresponding thereto,
> said first and second cores arranged adjacent to said strip,
> rigid spacer means for interconnecting both of said cores to form a single unit, and
> said field windings being formed on both said cores without end turns therebetween, by extending each winding from one slot in one of said cores directly to the opposing slot in said other core,
> whereby the energization of said field windings causes the single unit to move linearly along the length of said channel.

6. The improvement of claim 5 wherein said base has a central slit to form a pair of longitudinal strips, and further including:

> a pair of magnetically permeable cores located on said longitudinal strips to serve as secondary cores for said first and second cores,
> whereby said secondary cores remain stationary on said longitudinal strips while said first and second cores move linearly along said channel.

7. The improvement of claim 5 and further including:

> third and fourth magnetically permeable cores of substantially the same surface area as said first and second cores,
> said third core being disposed on the opposite side of the channel from the first core and aligned therewith,
> said fourth core being disposed on the opposite side of the channel from the second core and aligned therewith, and
> said rigid spacer means further extending to interconnect all of said cores to form a single unit,
> whereby upon the energization of said field windings to cause the single unit to move linearly along the length of the channel, the alignment of cores establishes only usable magnetic flux paths between said aligned pairs of cores.

8. The improvement of claim 7 and further including:

> field windings formed on said third and fourth cores without end turns therebetween,
> whereby each of the cores functions as a primary core and as the secondary core for the core disposed on the opposite side of the channel therefrom and aligned therewith.

9. In a linear induction motor including field windings, an elongated, flat metal plate having first and second longitudinal sides with the plate thus forming a secondary conductor and means for electrically energizing the field windings, the improvement comprising:

> first and second flat cores of magnetically permeable material,
> said cores aligned adjacent said plate and having aligned directly opposed field winding slots,
> said secondary conductor being made of electrically conductive material,
> means extending across said plate for rigidly spacing said first core from said second core and for interconnecting and insulating both of said cores to form a single unit, said spacing means having slots aligned with said aligned field winding slots in said cores, and
> said field windings being formed on both said cores, without end turns therebetween by extending each winding from the slot in one of said cores, through the aligned slot in said spacing means and through the opposed slot in said other core,
> whereby the energization of said field windings causes the single unit to move longitudinally along said plate.

10. The improvement of claim 9 and further including:

> a longitudinal support channel having said plate secured thereto,
> said cores and field windings being positioned in said channel, and
> stationary secondary cores of magnetically permeable material affixed to said secondary conductors,
> whereby the energization of said field windings causes the single unit to move linearly with respect to said plate and channel, with said channel providing a guideway for said single unit.

11. The improvement of claim 10 wherein said channel and plate are integrally formed as an elongated extrusion.

12. The improvement of claim 9 and further including a longitudinal support channel secured to said plate, wherein said elongated plate is disposed in said channel to define a plurality of elongated tracks, said first and second cores being disposed in two of said tracks, and further including:

third and fourth magnetically permeable cores, spaced from each other and said first and second cores by said spacing means whereby the four cores form a single unit, said third and fourth cores being of the same surface area as said first and second cores, respectively, field windings being formed on said third and fourth cores without end turns therebetween by extending each winding from one of said cores, through said spacing means, and across said other core, whereby the energization of said field windings causes the single unit to move linearly within said channel with each core serving both as a primary core and as a secondary core for the opposed core.

13. The improvement of claim 9 wherein said first and second cores are aligned on opposite longitudinal sides of said plate, and wherein said cores have a plurality of core teeth defining said slots between said core teeth, said teeth faces on said first core being spaced apart and opposite to the teeth faces on said second core, and each field winding is a closed conductive loop shaped as a saddle, said loop having a front portion and a rear portion with the front being wider and higher than the rear portion.

14. The improvement of claim 13 including an elongated channel integrally formed with said elongated plate as an extrusion.

* * * * *